United States Patent
Okayasu (10) Patent No.: US 6,201,822 B1
(45) Date of Patent: Mar. 13, 2001

(54) OPTICAL SIGNAL TRANSMISSION APPARATUS AND OPTICAL SIGNAL TRANSMISSION METHOD

(75) Inventor: Toshiyuki Okayasu, Tokyo (JP)

(73) Assignee: Advantest Corporation, Tokyo (JP)

(*) Notice: Subject to any disclaimer, the term of this patent is extended or adjusted under 35 U.S.C. 154(b) by 0 days.

(21) Appl. No.: 09/136,968

(22) Filed: Aug. 20, 1998

(30) Foreign Application Priority Data

Aug. 20, 1997 (JP) .................................................. 9-223856

(51) Int. Cl.[7] ...................................................... H01S 3/00
(52) U.S. Cl. ............................................... 372/38; 359/158
(58) Field of Search ................................... 359/110, 158; 372/38; 385/24, 89

(56) References Cited

U.S. PATENT DOCUMENTS

| | | | |
|---|---|---|---|
| 5,107,362 | 4/1992 | Motoshima et al. | 359/187 |
| 5,212,700 | 5/1993 | Okita | 372/38 |

FOREIGN PATENT DOCUMENTS 0 158 264   10/1985   (EP) .

OTHER PUBLICATIONS

Patent Abstract, Shikada Minoru JP 1–112789 A (NEC CORP.) May 1, 1989 abstract, [on line] retrieved on Apr. 27, 2000, retrieved from PAJ Database,.

Patent Abstract, Endo Katsuhiro JP 5–145491 A (Fuji Electric.) Jun. 11, 1993 abstract, [on line] retrieved on Apr. 27, 2000, retrieved from PAJ Database.

*Primary Examiner*—Frank G. Font
*Assistant Examiner*—Gioacchino Inzirillo
(74) *Attorney, Agent, or Firm*—Pillsbury Madison & Sutro LLP (57) ABSTRACT

A parallel optical signal transmission apparatus suppresses a power source noise, a drift, and timing jitter and drift caused by changes in temperature. The parallel optical signal transmission apparatus has a reference current source 4, which outputs as a direct current reference current a current value that corresponds to a prescribed proportion of a drive current of the laser driver 11, installed on the transmission side and a reference laser diode 121, which emits a standard reference optical signal driven by the direct current reference current, installed on the transmission side. A voltage signal that corresponds to the direct current reference current, which has been converted by the current-voltage conversion circuit 21, is applied as the reference voltage $V_{ref}$ to the comparator 24.

32 Claims, 9 Drawing Sheets

OPTICAL SIGNAL TRANSMISSION APPARATUS AND OPTICAL SIGNAL TRANSMISSION METHOD

BACKGROUND OF THE INVENTION

1. Field of Invention

The present invention relates to an optical signal transmission apparatus, an optical signal propagation apparatus, and an optical signal transmission method, and more particularly, to an optical signal transmission apparatus, an optical signal propagation apparatus, and an optical signal transmission method that convert multiple electrical signals into optical signals, and batch-transmit these optical signals via optical fibers.

2. Description of Related Art

Figure 1:
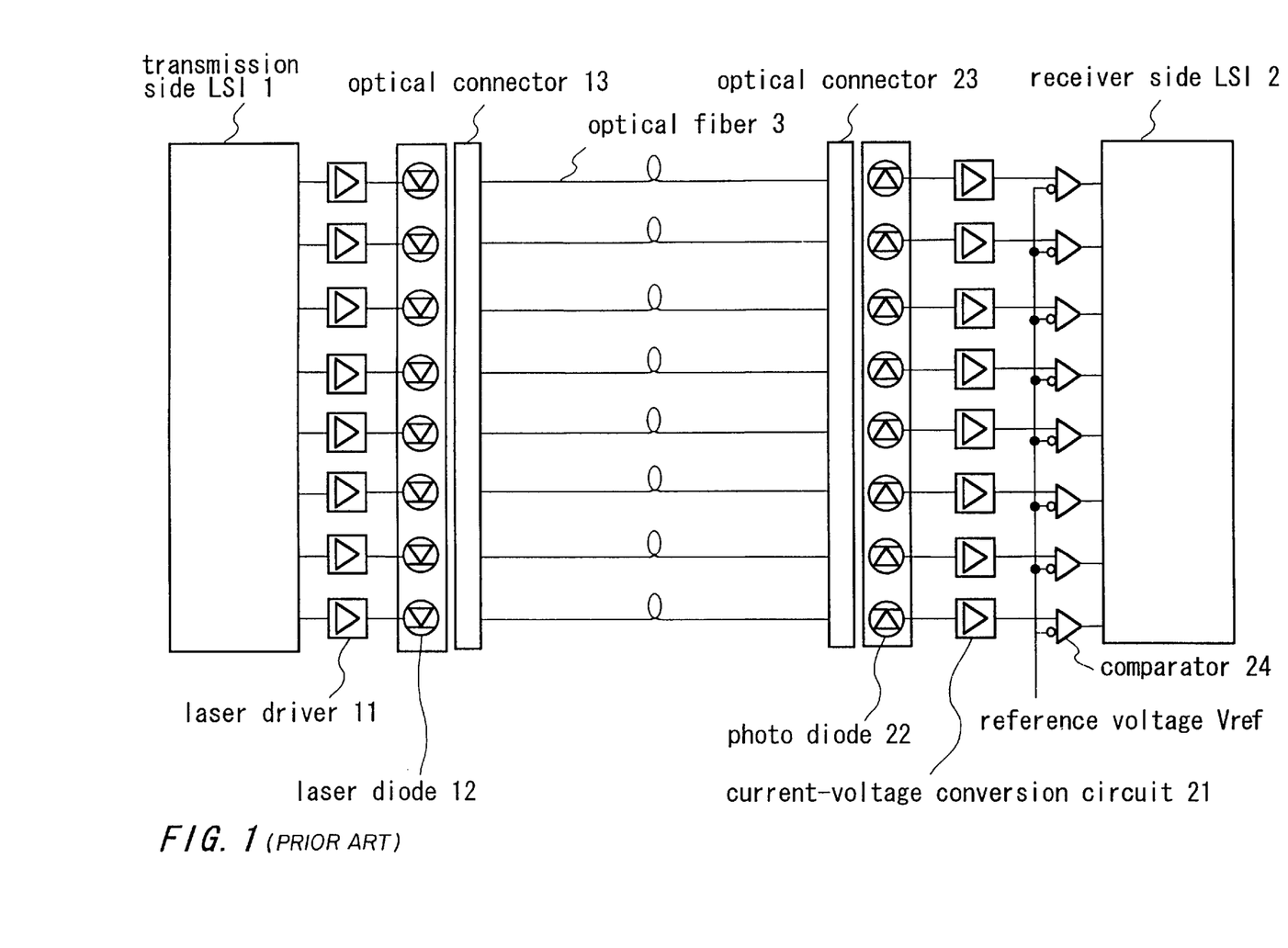
FIG. 1 shows a conventional example of a parallel optical signal propagation apparatus.

An example of a conventional optical signal transmission apparatus will be explained with reference to FIG. 1. In FIG. 1, reference numeral 1 refers to a transmission side LSI composed of a CMOS, Bi-CMOS, bipolar, GaAs or the like which is a logic circuit for processing multiple electric signals separately. Reference numeral 11 refers to a laser driver for amplifying an output electric signal of the transmission side LSI 1. Reference numeral 12 refers to a laser diode or a laser diode array, which generates an optical signal that corresponds to this output electric signal driven by the output electric signal that has been amplified by the laser driver 11. Reference numeral 13 refers to an optical connector. Reference numeral 3 refers to an optical fiber or optical fiber tape. The laser diode 12 is optically coupled with the optical fiber 3 via the optical connector 13. The optical signal generated by the laser diode 12 is transmitted to outside via the optical fiber 3.

Reference numeral 2 refers to a receiver side LSI composed of a CMOS, a Bi-CMOS, bipolar, GaAs or the like which is a logic circuit for processing multiple electric signals separately. Here, reference numeral 22 refers to a photo-diode or a photo diode array. Reference numeral 23 refers to a receiver side optical connector. The photo diode 22 is optically coupled with the optical fiber 3 via the optical connector 23. This photo diode 22 photoelectric-converts the optical signal, which has been transmitted from outside via the optical fiber 3, into an electric current that corresponds to the original electric signal. The output electric current signal of the photo-diode 22 is supplied to a current-voltage conversion circuit 21, which converts the output electric current signal of the photo-diode 22 into a voltage signal. Reference numeral 24 refers to a comparator. The voltage signal output from the current-voltage conversion circuit 21 is applied to one input terminal of the comparator 24. A reference voltage $V_{ref}$ is applied to the other input terminal of the comparator 24.

As has been explained above, when a signal is transmitted from the transmission side LSI 1 to the receiver side LSI 2 via the optical fiber, the output electric signal of the transmission side LSI1 is input to the laser driver 11. The laser diode 12 is then driven in response to the output signal of the transmission side LSI1. The photo diode 22 receives via the receiver side optical connector 23 the optical signal that has been transmitted via the optical connector 13 and optical fiber 3. The photo diode 22 then generates an electric current signal pulse. The current-voltage conversion circuit 21 converts the electric current signal pulse, which has been generated by the photo-diode 22, into a voltage signal. The comparator then 24 compares the voltage signal with the reference voltage $V_{ref}$. The voltage signal is then input as a logic signal to the receiver side LSI 2.

Here, the drive current-emission power characteristic of the laser diode 12 is susceptible changes in temperature. Specifically, the emission power intensity of the laser diode 12 changes as the surrounding temperature of the laser diode 12 and the amount of self-generated heat change. The change in the emission power intensity causes the timing accuracy of the transmission signal to deteriorate. The change in the power source voltage of the laser diode 12 also causes the timing accuracy to deteriorate.

SUMMARY OF THE INVENTION

Given these problems, it is an object of the present invention to provide an optical signal transmission apparatus and an optical signal transmission method capable of solving the above-stated problems. The object of the present invention can be achieved by a combination of characteristics described in the independent claims of the present invention. The dependent claims of the present invention determine further advantageous embodiments of the present invention. This invention provides a parallel optical signal transmission apparatus which has a laser diode and a photo diode, that suppresses timing jitter and drift generated by a power source noise, a drift, and changes in temperature, thereby solving the above-described problem.

According to the first aspect of the present invention, an optical signal transmission apparatus having a laser driver for amplifying an electric signal to be transmitted and an optical signal laser diode for outputting an optical signal based on the electric signal is provided. This optical signal transmission apparatus has a reference current source which outputs as a reference current a prescribed proportion of the maximum current value of the electric signal, and a reference laser diode which generates a standard reference light, driven by the reference current.

According to the second aspect of the present invention, an optical signal transmission apparatus as described in the first aspect of the present invention is provided which has a plurality of the laser drivers which output a plurality of the electric signals in parallel.

According to the third aspect of the present invention, an optical signal transmission apparatus as described in the first or second aspect of the present invention is provided such that the laser diode and the reference laser diode are structured as a laser diode array.

According to the fourth aspect of the present invention, an optical signal transmission apparatus as described in any of the first through third aspects of the present invention is provided such that the reference current source outputs as the reference current approximately ½ the maximum current value of the electric signal.

According to the fifth aspect of the present invention, an optical signal transmission apparatus as described in any of the first through fourth aspects of the present invention is provided such that the reference laser diode constantly outputs the standard reference light.

According to the sixth aspect of the present invention, an optical signal propagation apparatus is provided. This optical signal propagation apparatus has a transmission unit which converts an electric signal into an optical signal and transmits the optical signal, having a laser driver for amplifying the electric signal, an optical signal laser diode which outputs the optical signal based on the electric signal which the laser driver has amplified, a reference current source which outputs as a transmission side reference current a prescribed proportion of the maximum current value of the electric signal, and a reference laser diode which outputs a standard reference light based on the transmission side reference current. This optical signal propagation apparatus also has an optical fiber for propagating the optical signal, and a receiving unit which receives the optical signal that is propagated through the optical fiber. The receiving unit has a current signal photo diode which receives the optical signal, which has been transmitted through the optical fiber, and converts the received optical signal into a corresponding current signal, a reference current photo diode which receives the standard reference light, which has been transmitted through the optical fiber, and converts the standard reference light into a corresponding receiver side reference current, a current-voltage conversion circuit which converts the current signal and the receiver side reference current into a voltage signal and a reference voltage, respectively, and a comparator which compares the voltage signal with the reference voltage.

According to the seventh aspect of the present invention, an optical signal propagation apparatus as described in the sixth aspect of the present invention is provided such that the transmission unit has a plurality of the laser drivers which output a plurality of the electric signals in parallel.

According to the eighth aspect of the present invention, an optical signal propagation apparatus as described in the seventh aspect of the present invention is provided such that the receiving unit has a plurality of the comparators which compare a plurality of the voltage signals with the reference voltage in parallel.

According to the ninth aspect of the present invention, an optical signal propagation apparatus as described in any of the sixth through eighth aspects of the present invention is provided such that the optical signal laser diode and reference laser diode are structured as a laser diode array.

According to the tenth aspect of the present invention, an optical signal propagation apparatus as described in any of the sixth through ninth aspects of the present invention is provided such that the reference current source outputs as the transmission side reference current approximately ½ the maximum current value of the electric signal.

According to the eleventh aspect of the present invention, an optical signal propagation apparatus as described in any of the sixth through tenth aspects of the present invention is provided such that the reference laser diode constantly outputs the standard reference light.

According to the twelfth aspect of the present invention, an optical signal propagation apparatus as described in any of the sixth through eleventh aspects of the present invention is provided such that the transmission unit further has a transmission side LSI which outputs the electric signal, and the laser driver and the reference current source are embedded in the transmission side LSI.

According to the thirteenth aspect of the present invention, an optical signal propagation apparatus as described in any of the sixth through twelfth aspects of the present invention is provided such that the receiving unit further has a receiving side LSI which converts a comparison result of the comparator into a corresponding original electric signal.

According to the fourteenth aspect of the present invention, an optical signal propagation apparatus as described in the thirteenth aspect of the present invention is provided such that the current-voltage conversion circuit and the comparator are embedded in the receiving side LSI.

According to the fifteenth aspect of the present invention, an optical signal propagation apparatus as described in any of the sixth through fourteenth aspects of the present invention is provided such that the transmission unit further has an emission power compensation circuit including a compensation photo diode which receives a portion of an output light of the reference laser diode, converts the received output light into a corresponding compensation current, and outputs the compensation current. This optical signal propagation apparatus also has a compensation current-voltage conversion circuit which converts the compensation current, which the compensation photo diode has output, into a compensation voltage and outputs the compensation voltage. In this case, the emission power compensation circuit feeds the compensation voltage, which the compensation current-voltage conversion circuit has output, back to the laser drive and the reference current source.

According to the sixteenth aspect of the present invention, an optical signal transmission apparatus is provided. This optical signal transmission apparatus has a laser driver for amplifying an electric signal to be transmitted, a reference current source which outputs as a reference current a prescribed proportion of the maximum current value of the electric signal, a laser diode which outputs an optical signal and a standard reference light based on the electric signal and the reference current, respectively, and a transmission side switch which causes the laser diode to connect selectively to the laser driver or the reference current source.

According to the seventeenth aspect of the present invention, an optical signal transmission apparatus as described in the sixteen aspect of the present invention is provided, which has a plurality of the laser drivers which output a plurality of the electric signals in parallel.

According to the eighteenth aspect of the present invention, an optical signal propagation apparatus is provided. This optical signal propagation apparatus has a transmission unit which converts an electric signal into an optical signal and transmits the optical signal, having a laser driver for amplifying the electric signal, a reference current source which outputs as a transmission side reference current a prescribed proportion of the maximum current value of the electric signal, a laser diode which outputs the optical signal based on the electric signal, which the laser driver has amplified, and a standard reference light based on the transmission side reference current, and a transmission side switch which causes the laser diode to connect selectively to the laser driver or the reference current source, an optical fiber for propagating the optical signal. This optical signal propagation apparatus also has a receiving unit which receives the optical signal that is propagated through the optical fiber, having a photo diode which receives the optical signal, which has been transmitted through the optical fiber, converts the received optical signal into a corresponding current signal, receives the standard reference light, and converts the standard reference light into a corresponding receiver side reference current, a current-voltage conversion circuit which converts the current signal and the receiver side reference current into a voltage signal and a reference voltage, respectively, and a comparator which compares the voltage signal with the reference voltage.

According to the nineteenth aspect of the present invention, an optical signal propagation apparatus as described in the eighteenth aspect of the present invention is provided such that the transmission unit has a plurality of the laser drivers which output a plurality of the electric signals in parallel.

According to the twentieth aspect of the present invention, an optical signal propagation apparatus as described in the nineteenth aspect of the present invention is provided such that the receiving unit has a plurality of the comparators which compare a plurality of the voltage signals with the reference voltage in parallel.

According to the twentieth aspect of the present invention, an optical signal propagation apparatus as described in any of the eighteenth through twentieth aspects of the present invention is provided such that the receiving unit further has a reference voltage output circuit which applies the reference voltage to the comparator.

According to the $22^{nd}$ aspect of the present invention, an optical signal propagation apparatus as described in the $21^{st}$ aspect of the present invention is provided such that the receiving unit further has a receiver side switch which causes the reference voltage to be input to the reference voltage output circuit when the current-voltage conversion circuit outputs the reference voltage.

According to the $23^{rd}$ aspect of the present invention, an optical signal propagation apparatus as described in the eighteenth aspect of the present invention is provided such that the transmission side switch is switched periodically to the reference current source.

According to the $24^{th}$ aspect of the present invention, an optical signal propagation apparatus as described in the $23^{rd}$ aspect of the present invention is provided such that a period with which the transmission side switch is switched to the reference current source is determined so that the fluctuation of the emission power intensity of the laser diode will not increase by a large amount during the period.

According to the $25^{th}$ aspect of the present invention, a method for propagating an optical signal from a transmission unit, which converts an electric signal into an optical signal and transmits the optical signal, via an optical fiber for propagating the optical signal, to a receiving unit for receiving the optical signal that has been propagated through the optical fiber is provided. This method has the steps of outputting the electric signal from the transmission unit, periodically outputting as a transmission side reference current a prescribed proportion of the maximum current value of the electric signal from the transmission unit, outputting the optical signal to the optical fiber based on the electric signal, and outputting a standard reference light to the optical fiber based on the transmission side reference current from the transmission unit, receiving the optical signal propagated through the optical fiber and converting the optical signal into a corresponding current signal, and receiving the standard reference light propagated through the optical fiber and converting the standard reference light into a corresponding receiver side reference current in the receiving unit, converting the current signal into a voltage signal, and converting the receiver side reference current into a reference voltage in the receiving unit, and comparing the voltage signal with the reference voltage in the receiving unit.

According to the $26^{th}$ aspect of the present invention, a method for propagating an optical signal as described in the $25^{th}$ aspect of the present invention is provided such that a plurality of the electric signals are output in parallel in the step of outputting the electric signal.

According to the $27^{th}$ aspect of the present invention, a method for propagating an optical signal from a transmission unit, which converts an electric signal into an optical signal and transmits the optical signal, via an optical fiber for propagating the optical signal, to a receiving unit for receiving the optical signal that has been propagated through the optical fiber is provided. This method has the steps of outputting the electric signal from the transmission unit, periodically outputting a positive current having a value that is larger than a prescribed proportion of a maximum current value of the electric signal and a negative current having a value that is smaller than the prescribed proportion of the maximum current value of the electric signal from the transmission unit, outputting the optical signal to the optical fiber based on the electric signal, outputting a positive reference light to the optical fiber based on the positive current, and outputting a negative reference light to the optical fiber based on the negative current from the transmission unit, receiving the optical signal that has been propagated through the optical fiber and converting the optical signal into a corresponding current signal, receiving the positive reference light that has been propagated through the optical fiber and converting the positive reference light into a corresponding positive current, and receiving the negative reference light that has been propagated through the optical fiber and converting the negative reference light into a corresponding negative current in the receiving unit, converting the current signal, which corresponds to the optical signal, into a voltage signal in the receiving unit, generating a reference voltage based on the positive current and the negative current in the receiving unit, and comparing the voltage signal with the reference voltage in the receiving unit.

According to the $28^{th}$ aspect of the present invention, a method for propagating an optical signal as described in the $27^{th}$ aspect of the present invention is provided such that a plurality of the electric signals are output in parallel in the step of outputting the electric signal.

According to the $29^{th}$ aspect of the present invention, an optical signal propagation apparatus is provided. This optical signal propagation apparatus has a transmission unit which converts an electric signal into an optical signal and transmits the optical signal, having a laser driver for amplifying the electric signal, a binary signal source which outputs a binary output having a prescribed duty ratio to the laser driver, and a laser diode which outputs the optical signal based on the electric signal and a binary reference light based on the binary output. This optical signal propagation apparatus has an optical fiber for propagating the optical signal. This optical signal propagation apparatus further has a receiving unit which receives the optical signal that is propagated through the optical fiber, having a photo diode which receives the optical signal, which has been transmitted through the optical fiber, converts the optical signal into a corresponding current signal, receives the binary reference light and converts the binary reference light into a corresponding binary reference current, a current-voltage conversion circuit which converts the current signal and the binary reference current into a voltage signal and a binary reference voltage, respectively, a smoothing circuit which outputs a reference voltage based on the binary reference voltage and the duty ratio, respectively, and a comparator which compares the voltage signal with the reference voltage.

According to the $30^{th}$ aspect of the present invention, a method for propagating an optical signal as described in the $29^{th}$ aspect of the present invention is provided such that the transmission unit has a plurality of the laser drivers which output a plurality of the electric signals in parallel.

According to the $31^{st}$ aspect of the present invention, a method for propagating an optical signal as described in the $30^{th}$ aspect of the present invention is provided such that the receiving unit has a plurality of the comparators which compare a plurality of the electric signals with the reference voltage in parallel.

According to the 32$^{nd}$ aspect of the present invention, a method for propagating an optical signal as described in any of 29$^{th}$ through the 31$^{st}$ aspect of the present invention is provided such that the binary signal source is a clock signal source.

DETAILED DESCRIPTION OF THE INVENTION

The present invention will be explained with reference to embodiments of the present invention. However, the following embodiments do not limit the scope of the present invention described in the claims. Moreover, not all the combinations of the characteristics described in the embodiments are necessarily essential for solving the present invention.

Figure 2:
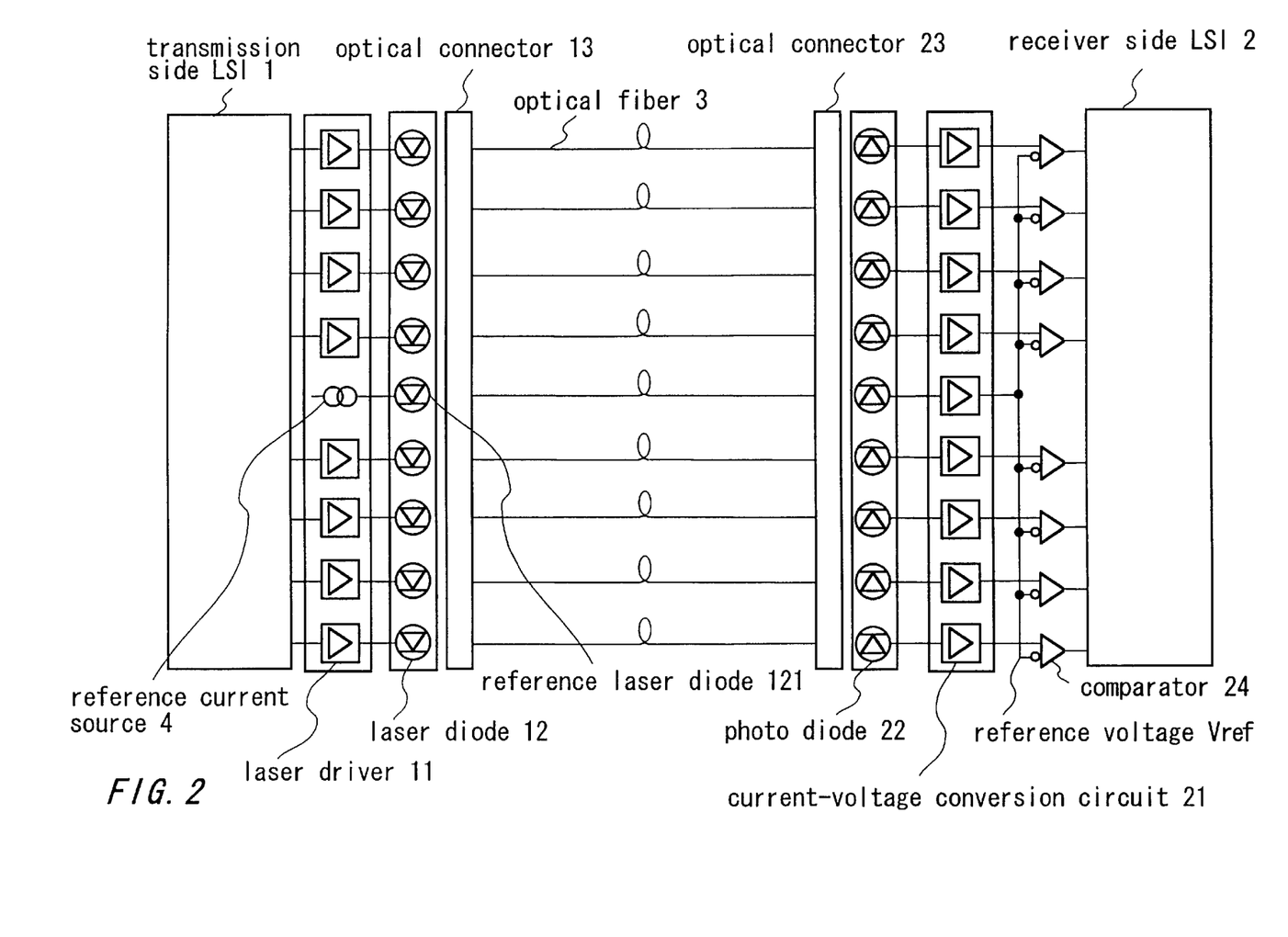
FIG. 2 shows an optical signal propagation apparatus according to the first embodiment of the present invention.

An embodiment of the present invention will be explained with reference to FIG. 2. In FIG. 2, those reference numerals that are common to those used in FIG. 1 refer to the same components. A structure for transmitting an optical signal to an optical fiber is called a transmission unit. A structure for receiving an optical signal from an optical fiber is called a receiving unit. In FIG. 2, the transmission unit has a transmission side LSI 1, a reference current source 4, a laser driver 11, a laser diode 12, and an optical connector 13. Moreover, the receiving unit has an optical connector 23, a photo-diode 22, a current-voltage conversion circuit 21, a comparator 24, and a receiver side LSI 2.

In FIG. 2 also, as in FIG. 1, an output electric signal of the transmission side LSI 1 is input to a laser driver 11. A laser diode 12 is then driven in response to the output signal of the transmission side LSI 1. An optical signal is transmitted via an optical connector 13 and an optical fiber 3. A photo diode 22 receives the optical signal via a receiver side optical connector 23. The photo diode 22 then emits an electric current signal pulse. The electric current signal pulse emitted by the photo diode 22 is then converted into a voltage signal by a current-voltage conversion circuit 21. A comparator 24 compares the voltage signal with a reference voltage $V_{ref}$. The voltage signal is then input as a logic signal to the receiver side LSI 2.

In this embodiment, the transmission side is equipped with a reference current source 4 which outputs a constant current. A current that is a prescribed proportion of the drive current of the laser driver 11, for example, ½ the current, is output as a direct current reference current from the reference current source 4. In this way, a single reference laser diode 121 is made to constantly emit light. The light that the reference laser diode 121 emits is used as a standard reference optical signal. This standard reference optical signal is also transmitted through the same transmission path as the transmission path for transmitting other optical signals. In other words, another laser diode, which is identical to the laser diode 12 that is used to transmit other optical signals, is installed and used as the reference laser diode 121 in the same manner. The same optical connector 13, optical fiber 3, receiver side optical connector 23, photo diode 22, and current-voltage conversion circuit 21, which are used to transmit other signals, are used to transmit the standard reference optical signal. The voltage signal that corresponds to the direct current reference current, which has been converted by the current-voltage conversion circuit 21, is applied as the reference voltage $V_{ref}$ for all the receiver side comparators 24.

As has been explained above, on the transmission side, the emission power intensity of the laser diode 12 changes due to changes in the surrounding temperature of the laser diode 12 and changes in the self-generated heat of the laser diode 12. As a result, the timing accuracy of the transmission signal deteriorated. Moreover, the timing accuracy also deteriorated as the power source voltage of the laser diode 12 changed. However, according to the present embodiment, a laser diode that is identical to the laser diode 12 for transmitting optical signals is installed in the same manner. This laser diode is used as the reference laser diode 121. Therefore, the reference laser diode 121 is influenced by almost the same degree of change in the surrounding temperature and almost the same amount of self-generated heat as the laser diode 12 which transmits optical signals. In other words, the voltage signal that is applied to one input terminal of all the receiver side comparators 24 receives the same degree of change in the surrounding temperature and the same amount of change in the self-generated heat as the reference voltage $V_{ref}$ that is applied to the other input terminal. Similarly, in the case in which the power source voltage of the laser diode 12 changes, the voltage signal that is applied to one input terminal of all the receiver side comparators 24 receives the same amount of change in the power source voltage as the reference voltage $V_{ref}$ that is applied to the other input terminal. The input supplied to one terminal of the comparator 24 contains the same amount of change as the input supplied to the other input terminal of the comparator 24. Therefore, even if the change in the surrounding temperature of the laser diode, the change in the amount of self-generated heat of the laser diode 12, and the change in the power source voltage of the laser diode 12 cause the optical intensity of the transmission signal to change, the amounts of change contained in the two input terminals cancel each other. As a result, the deterioration of the timing accuracy can be prevented.

Here, in order to explain a second embodiment, a laser diode array is used for the multiple laser diodes 12 of the parallel optical signal transmission apparatus. When the laser diodes 12 are formed in an array, the individual laser diodes are thermally coupled with each other tightly. The fact that the individual laser diodes are thermally coupled with each other tightly means that the self-generated heat generated by the individual diodes is conducted to each other and cancels each other. As a result, the changes in the characteristic caused by the change in the self-generated heat of the laser diode also cancel each other. As has been explained above, when the multiple laser diodes 12 are formed in a laser diode array, the change in the characteristic caused by the change in the self-generated heat of the laser diodes can be canceled, which is an advantage.

A third embodiment of the present invention will be explained with reference to FIG. 3.

Figure 3:
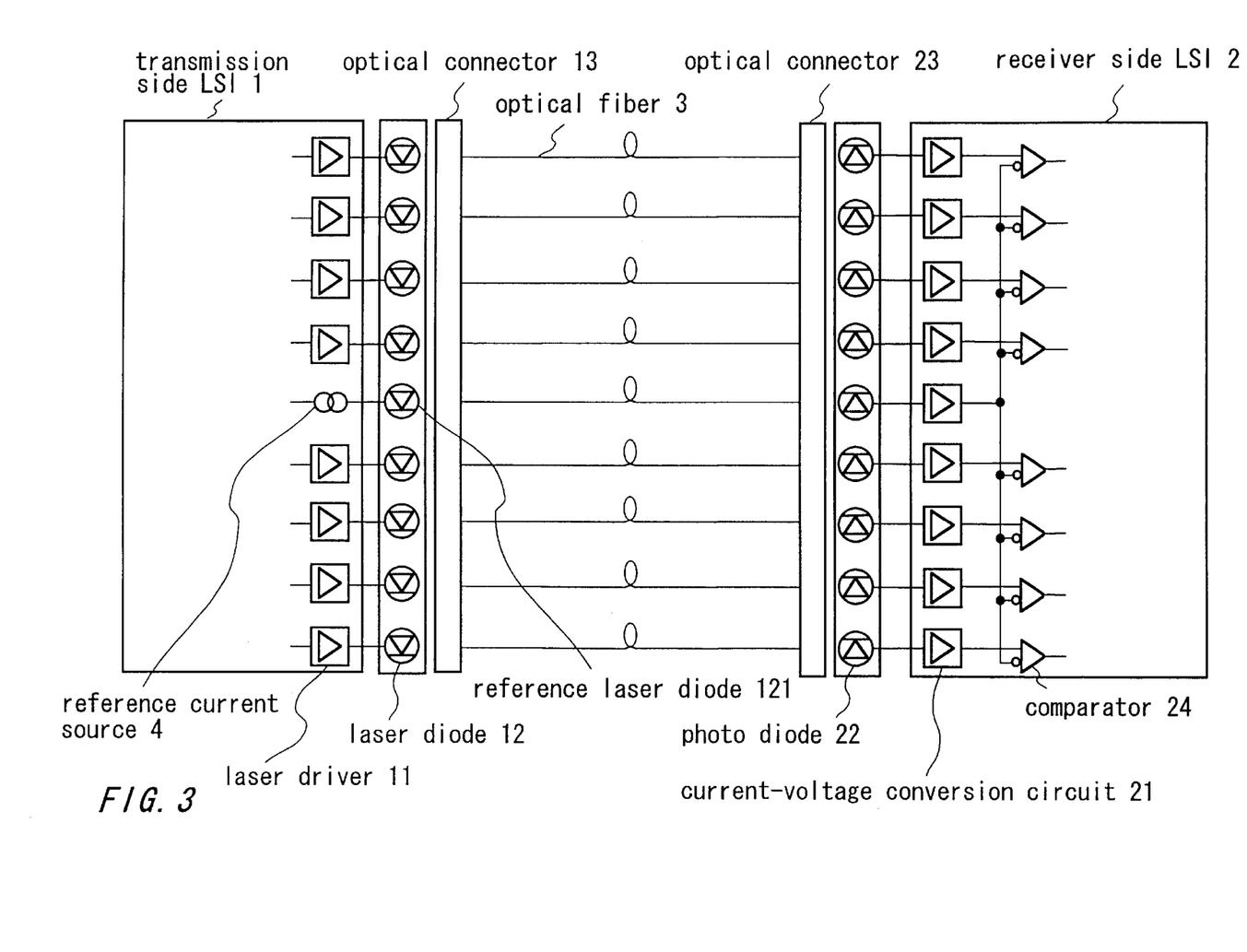
FIG. 3 shows an optical signal propagation apparatus according to the third embodiment of the present invention.

In FIG. 3, the laser drivers 11 and reference current source 4 are installed inside the transmission side LSI, which is a logic circuit for processing multiple electric signals separately, together with other logic circuits. The current-voltage conversion circuits 21 and comparators 24 are installed inside the receiver side LSI 2, which is a logic circuit for converting transmitted optical signals into the original electric signals, together with other logic circuits.

As has been explained above, by installing the laser drivers 11 and reference current source 4 inside the transmission side LSI 1 together with other logic circuits, the multiple laser diodes are thermally coupled with each other tightly. Therefore, the embodiment shown in FIG. 3 has the advantage of the second embodiment besides the advantage of the first embodiment. By installing the photo diodes 22 inside the receiver side LSI 2 together with the other logic circuits, a high density packaging without any external circuit can be achieved. In addition, other circuits, the laser drivers 11 and reference current source 4 are installed inside the transmission side LSI 1 and signals are received inside a chip installed in the receiver side LSI 2. Therefore, the amount of power consumption due to signal transmission can be greatly reduced and the circuit operation can be accelerated.

Figure 4:
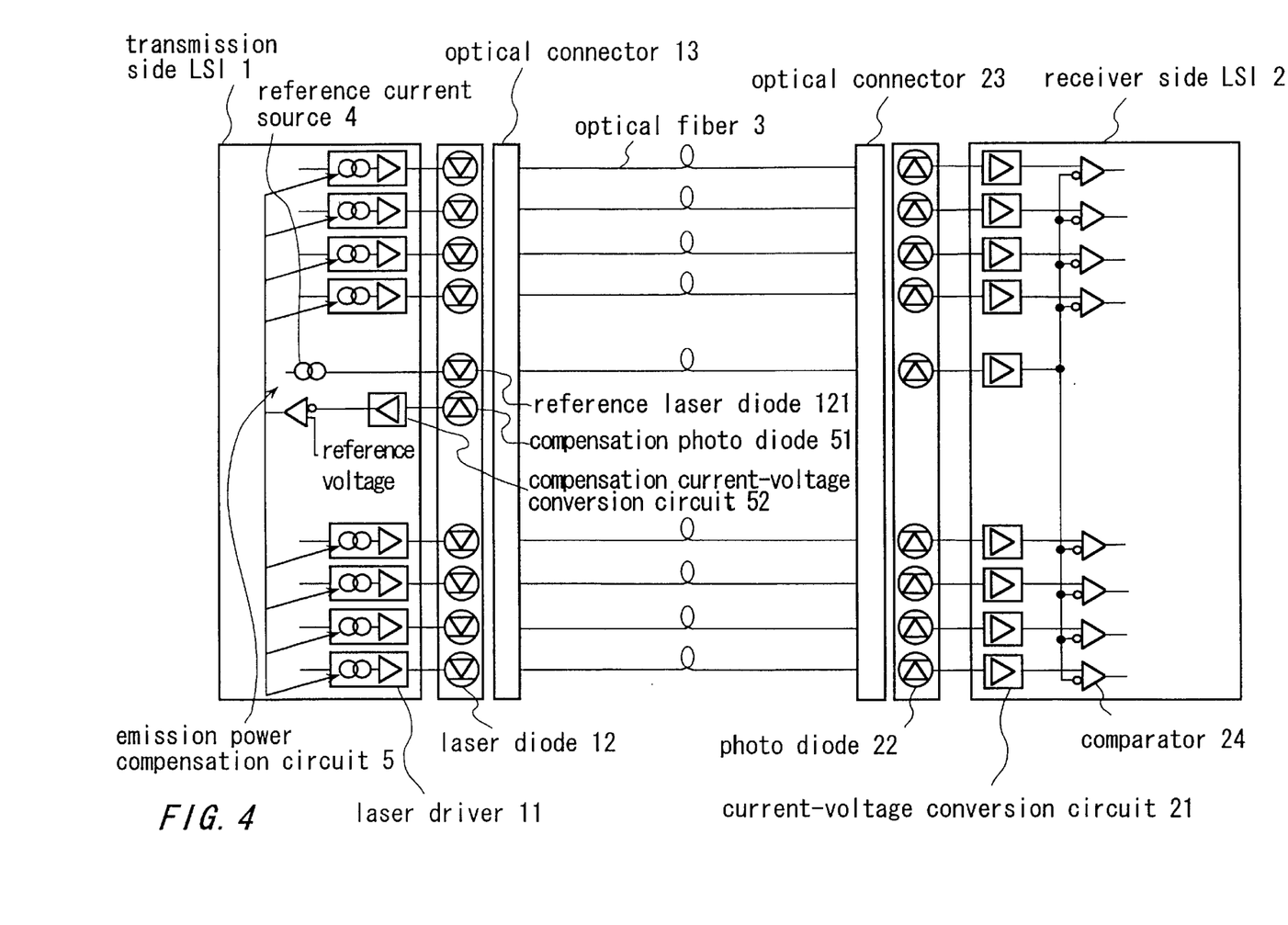
FIG. 4 shows an optical signal propagation apparatus according to the fourth embodiment of the present invention.

A fourth embodiment will be explained with reference to FIG. 4. In the fourth embodiment, an emission power compensation circuit 5 for stabilizing the absolute value of the emission power of the laser diode 12 is installed. This emission power compensation circuit 5 is composed of a compensation photo diode 51 for receiving a portion of the output light of the reference laser diode 121 which emits light driven by the reference current source 4 and a compensation current-voltage conversion circuit 52 for converting the output current signal of the compensation photo diode 51 into a voltage signal. The output of the compensation current-voltage conversion circuit 52 is fed back to each of the laser drivers 11 and the reference current source 4. The emission power compensation circuit 5 stabilizes the absolute value of the emission power of the laser diode 12 by controlling these output currents to a constant value.

By jointly using the above-described emission power compensation circuit 5, the drive current-emission power characteristic of the laser diode 12 is further stabilized.

Figure 5:
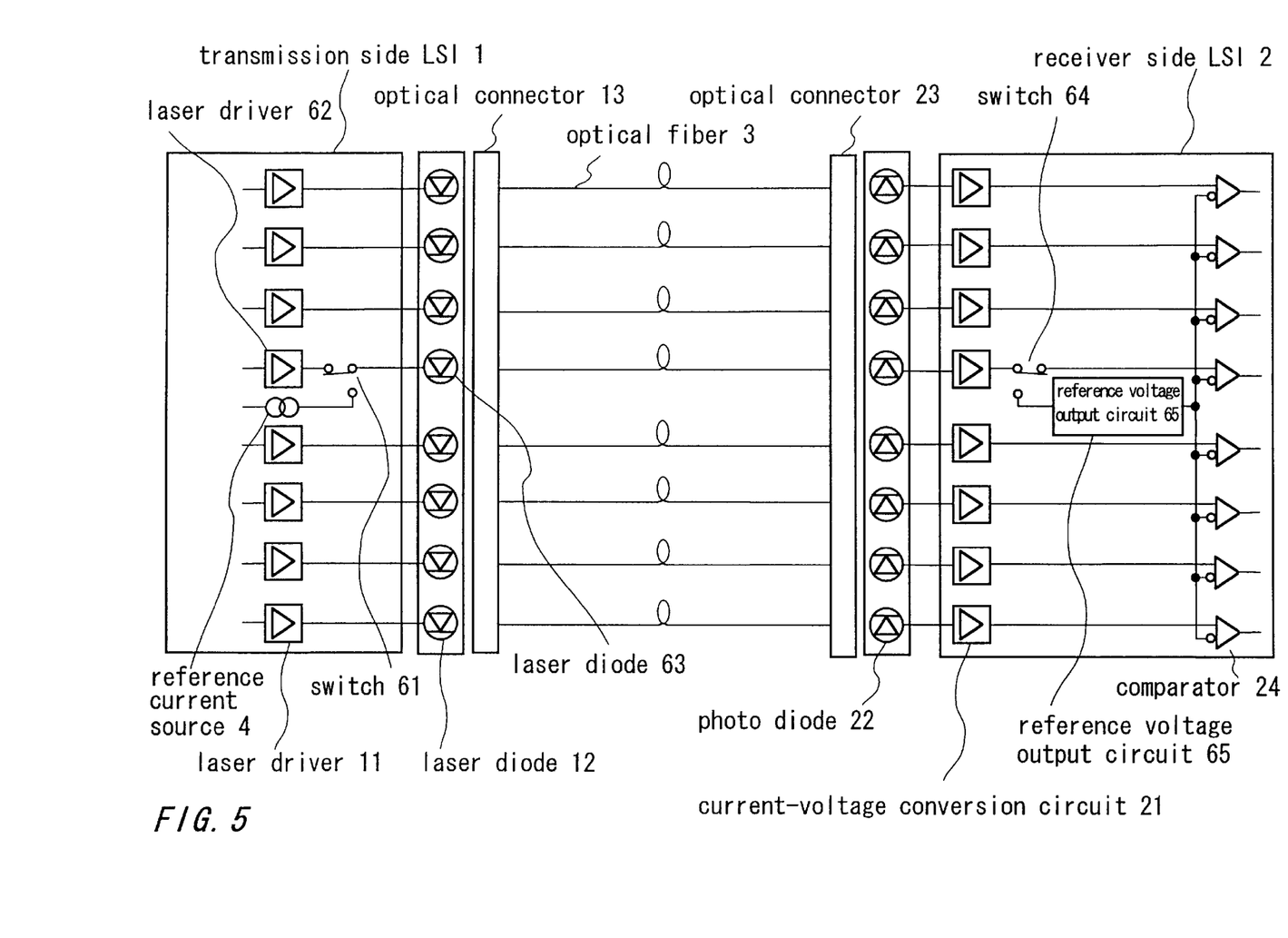
FIG. 5 shows an optical signal propagation apparatus according to the fifth embodiment of the present invention.

A fifth embodiment of the present invention will be explained with reference to FIG. 5. In the fifth embodiment, a standard reference optical signal is transmitted periodically through an optical fiber 3. As shown in the drawing, a first switch 61 is installed in the transmission side LSI 1. A second switch 64 and a reference voltage output circuit 65 are installed in the receiver side LSI 2.

In the transmission side LSI 1, the switch 61 selectively connects the laser diode 63 to the laser driver 62 or reference current source 4. In order to make the present embodiment comprehensible, different reference numerals are given to the laser driver 62 and laser driver 11, and to the laser diode 63 and laser diode 12. However, the laser driver 61 may be identical to the laser driver 11, and the laser diode 63 may be identical to the laser diode 12.

As has been explained above, the emission power intensity of a laser diode changes as the surrounding temperature and the amount of self-generated heat of the laser diode change. This change in the emission power intensity deteriorates the timing accuracy of a transmission signal. Therefore, the period for transmitting the standard reference optical signal needs to be determined so that the fluctuation of the emission power intensity of the laser diode 12 will not become large during the period. For example, the switch 61 connects to the reference current source 4 with the period of once every several seconds. As a result, the standard reference optical signal is transmitted once every several seconds through the optical fiber 3. The standard reference optical signal may be transmitted with longer or shorter period depending on the circumstance. When the switch 61 is connected to the laser driver 62, the laser diode 63 outputs an optical signal like the other laser diodes 12. In the receiver side LSI 2, the optical signal output from the laser diode 63 or standard reference optical signal is input to the current voltage conversion circuit 21.

The switch 64 selects the reference voltage output circuit 65 in synchronization with the switch 61. In other words, when the switch 61 is switched with a prescribed period to the reference current source 4 side and the laser diode 63 outputs a standard reference optical signal, the switch 64 is switched to the reference voltage output circuit 65 side. The reference voltage output circuit 65, which will be specified again with reference to FIGS. 9 and 10, holds at least during a prescribed period between the time at which the first standard reference optical signal is transmitted and the time at which the next standard reference optical signal is transmitted the value of the reference voltage $V_{ref}$ that corresponds to the standard reference optical signal. The reference voltage output circuit 65 outputs the reference voltage $V_{ref}$ to the input terminal of the comparator 24 for a prescribed period. The reference voltage output circuit 65 updates with a prescribed period the value of the reference voltage $V_{ref}$ that corresponds to the next standard reference optical signal.

A sixth embodiment of the present invention will be explained with reference to FIG. 6. In the sixth embodiment, the reference current source 4 and switch 61 shown in FIG. 5 are omitted. In this case, the laser driver 62 outputs an electric signal and a direct current reference current, controlled by a control unit (not shown in the drawing) of the transmission side LSI 1. The period during which the direct current reference current is output, that is, the period during which the standard reference optical signal is propagated, needs to be determined so that the fluctuation of the emission power intensity of the laser diode 12 will not become large during the period. In comparison with the fifth embodiment shown in FIG. 5, the reference current source 4 and switch 61 can be removed. As a result, the circuit configuration of the sixth embodiment is simplified.

Figure 7:
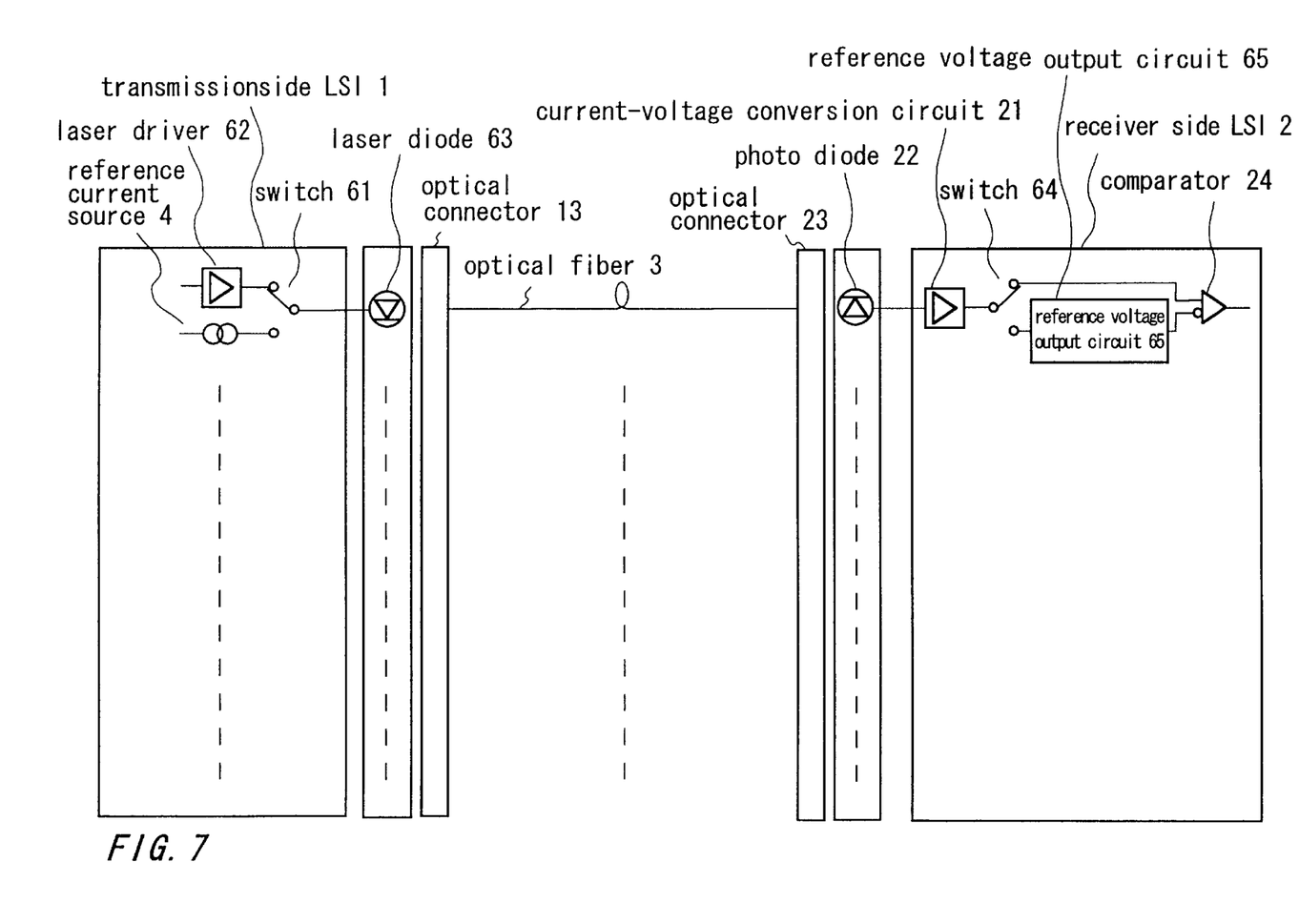
FIG. 7 shows an optical signal propagation apparatus according to the seventh embodiment of the present invention.

A seventh embodiment of the present invention will be explained with reference to FIG. 7. In the seventh embodiment, a reference current source 4, switches 61 and 64, and a reference voltage output circuit 65 are installed to each optical fiber 3. To simplify the explanation, only the configuration about one optical fiber 3 is shown in FIG. 7. The period during which the direct current reference current is output, that is, the period during which the standard reference optical signal is propagated, needs to be determined so that the fluctuation of the emission power intensity of the laser diode 12 will not become large during the period. Since the structure shown in FIG. 5 is installed to each optical fiber 3, the fluctuation of the emission power intensity of the laser diode 12 can be corrected independently for each of the optical fibers 3.

In the eight embodiment of the present invention, the reference current source 4 and switch 61 shown in FIG. 7 are omitted. In this case, the laser driver 62 outputs an electric signal and a direct current reference current, controlled by a control unit (not shown in the drawing) of the transmission side LSI 1. The laser driver 62 can output the direct current reference current periodically. This period is determined so that the emission power intensity of the laser diode 63 will not fluctuate by a large amount due to heat during the period.

Figure 6:
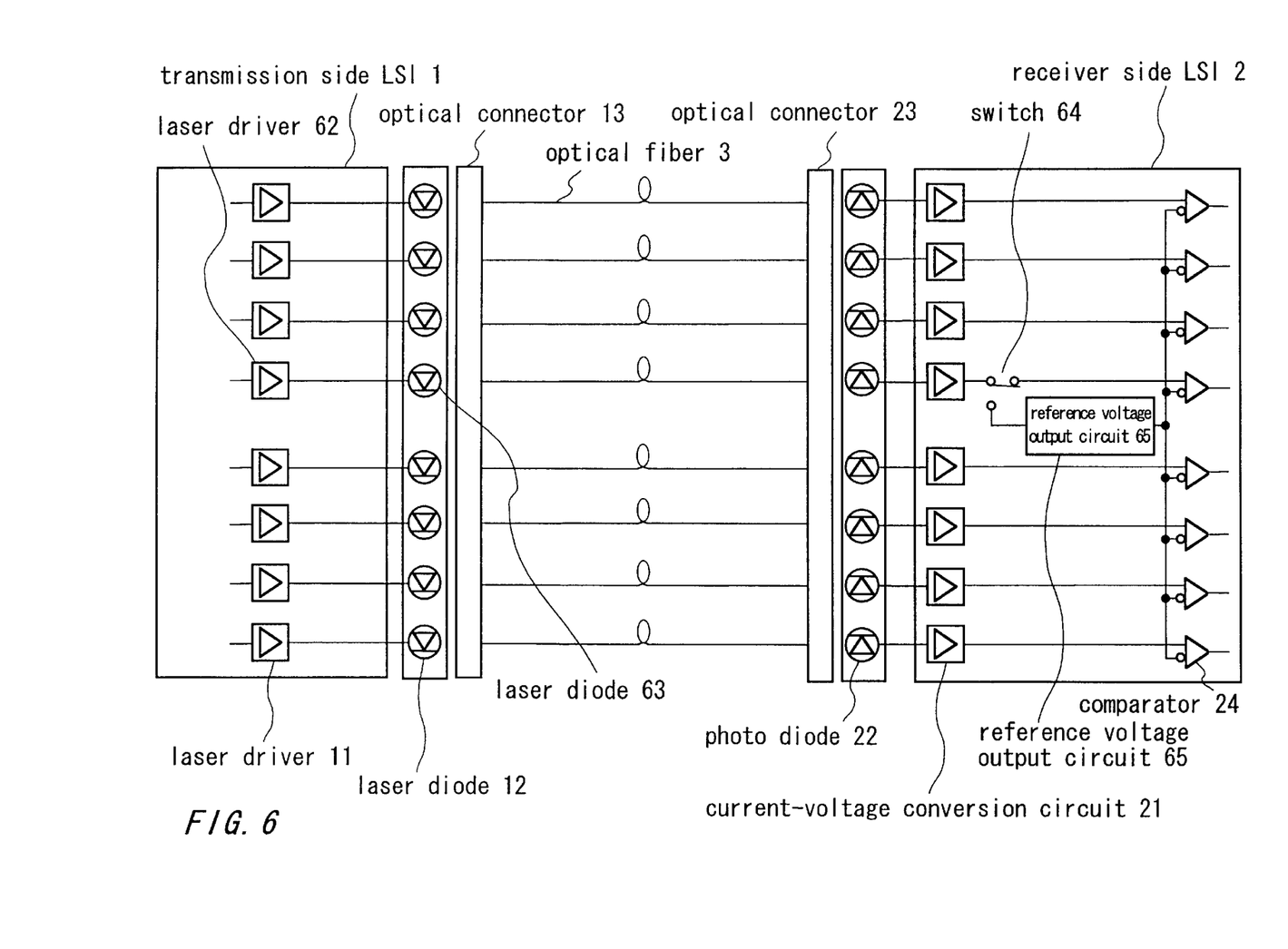
FIG. 6 shows an optical signal propagation apparatus according to the sixth embodiment of the present invention.

In the ninth embodiment of the present invention, the laser diode 62 outputs a positive current whose value is larger than the value of a reference current and a negative current whose value is smaller than the value of the reference current in the configuration shown in FIG. 6. This period is determined so that the emission power intensity of the laser diode 63 will not fluctuate by a large amount due to heat during the period. It is desirable that the absolute value of the difference between the value of the positive current and that of the reference current be equal to the absolute value of the difference between the value of the negative current and that of the reference current. The laser diode 63 outputs a positive reference optical signal to the optical fiber 3 based on the positive current, and a negative reference optical signal to the optical fiber 3 based on the negative current. The photo-diode 22 receives the positive and negative reference optical signals, and converts them into corresponding positive and negative current signals, respectively. The current-voltage conversion circuit 21 then converts the positive and negative current signals into corresponding positive and negative voltage signals, respectively. After this, the reference voltage output circuit 65 outputs the reference voltage $V_{ref}$ based on the positive and negative voltage signals. When the absolute value of the difference between the value of the positive current and that of the reference current is equal to the absolute value of the difference between the value of the negative current and that of the reference current, the reference voltage output circuit 65 sets the average of the positive voltage signal and negative voltage signal to the reference voltage $V_{ref}$. As in the previously explained embodiments, the reference voltage $V_{ref}$ is then compared with the voltage signal.

Figure 8:
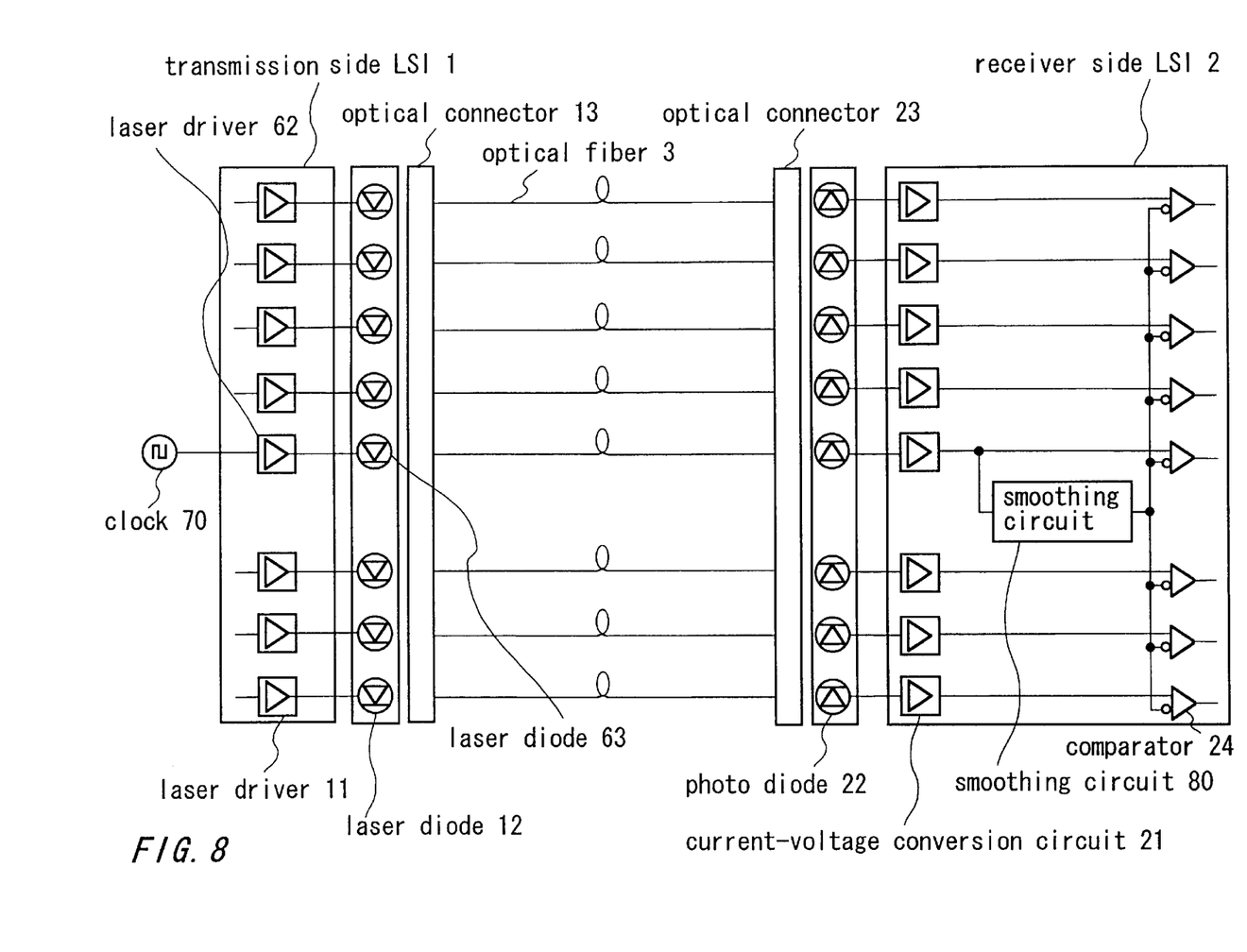
FIG. 8 shows an optical signal propagation apparatus according to the tenth embodiment of the present invention.

A tenth embodiment of the present invention will be explained with reference to FIG. 8. In the tenth embodiment, a clock 70 is connected to a laser driver 62. In this case, a smoothing circuit 80 is installed as a means for generating a reference voltage $V_{ref}$ to the receiver side LSI 2. When parallel optical signals need to be propagated, in order to synchronize all the signals, a system which propagates a clock signal together with the data (optical signals) is available. In the present embodiment, the reference voltage $V_{ref}$ is generated using this clock signal. In what follows, the operation of the present embodiment will be explained.

The laser driver 62 amplifies the data signal, which is an electric signal, and the clock signal, and outputs them to the laser diode 63. The laser diode 63 outputs an optical signal and based on the electric signal. In addition, based on the clock signal, the laser diode 63 outputs a binary reference optical signal that corresponds to the binary output of the clock signal. The optical signal and binary reference optical signal are sent to the photo-diode via the optical fiber 3. The photo-diode 22 receives the optical signal and binary reference optical signal, and converts them into a corresponding current signal and a corresponding binary reference current signal, respectively.

After the current-voltage conversion circuit 21 converts the binary reference current signal into a binary reference voltage signal, the current-voltage conversion circuit 21 sends the binary reference voltage signal to the smoothing circuit 80. The smoothing circuit 80 takes the time average of the binary reference voltage signal, and determines the reference voltage $V_{ref}$ to be equal to this time average. The period over which the time average of the binary reference voltage signal is taken is determined so that the emission power intensity of the laser diode 63 will not fluctuate by a large amount due to heat during the period. In the present embodiment, the reference voltage $V_{ref}$ is generated using a clock signal having a constant period. However, it is also possible to generate a reference voltage $V_{ref}$ using a binary signal that outputs a binary output with a prescribed duty ratio. On the other hand, after the current-voltage conversion circuit 21 converts the current signal into a voltage signal, the current-voltage conversion circuit 21 sends the voltage signal to the comparator 24. As in the previous embodiments, the comparator 24 compares the voltage signal with the reference voltage $V_{ref}$.

In the above-explained embodiments, in order to increase the accuracy of the apparatus, it is desirable that the characteristics variations of the laser diodes 12 and those of photo diodes 22, which are generated mainly during the manufacturing process, be adjusted. To accomplish this, for example, the characteristics of the laser diodes 12 and photo diodes 22 are measured. Based on the measurements, the driver currents of the laser diodes 12 are adjusted so that the outputs of the laser diodes 12 will become uniform, and the receiver side gains of the photo diodes 22 are adjusted so that the outputs of the photo diodes 22 will become uniform. These adjusted values based on the characteristic variations can be stored in, for example, an EEPROM or a memory of a control circuit.

Figure 9:
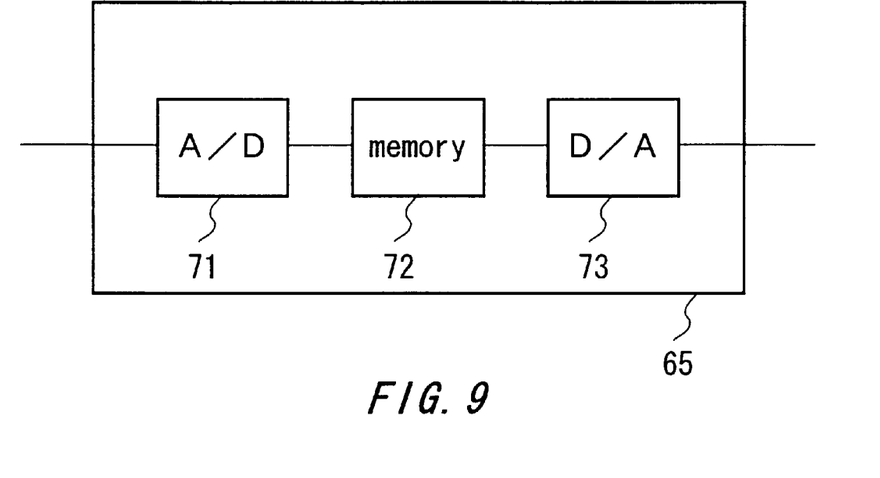
FIG. 9 shows an example of a reference voltage output circuit 65.

FIG. 9 shows an example of a reference voltage output circuit 63 which stores and outputs the reference voltage $V_{ref}$. This reference voltage output circuit 63 has an A/D converter 71, a memory 72, and a D/A converter 73. The reference voltage $V_{ref}$, which the current-voltage conversion circuit 21 has converted, is converted into a digital signal by the A/D converter 71, and then is stored in the memory 72. The D/A converter 73 then converts the stored value of the reference voltage $V_{ref}$ into an analog signal. The reference voltage $V_{ref}$, which has been converted into an analog signal, continues to be propagated to the comparator 24 until the next standard reference optical signal is transmitted.

Figure 10:
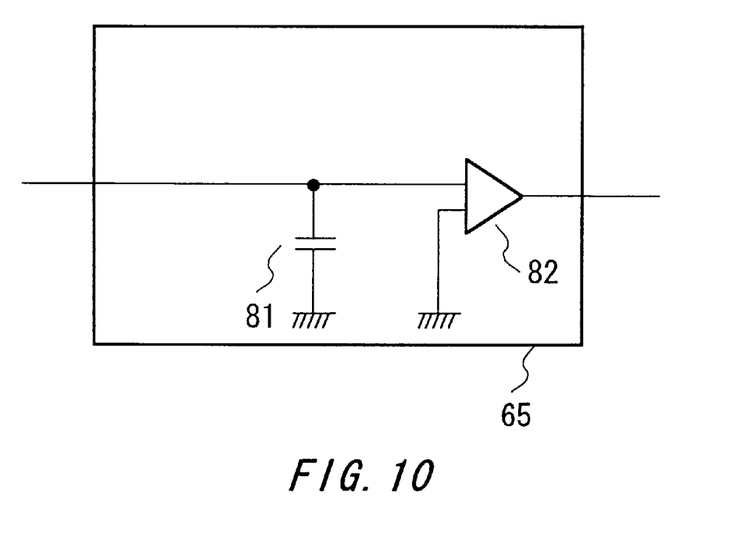
FIG. 10 shows another example of a reference voltage output circuit 65.

FIG. 10 shows another example of a reference voltage output circuit 63 which stores and outputs the propagated reference voltage $V_{ref}$. This reference voltage output circuit 63 is an analog memory having a capacitor 81 and a differential amplifier 82. First the switch 64 is closed, and the reference voltage $V_{ref}$ is propagated. When electric charge is accumulated in the capacitor 81, the switch 64 opens, and the reference voltage $V_{ref}$ is output from the differential amplifier 82 to the comparator 24.

As has been explained above, according to the present invention, a reference current source for outputting as a direct current reference current a current whose value corresponds to a prescribed proportion of the drive current of a laser driver and a reference laser diode which emits a standard reference optical signal driven by the direct current reference current are installed on the transmission side. In addition, a comparator to which a voltage signal, which corresponds to the direct current reference current that has been converted by a current-voltage conversion circuit, is applied as a reference voltage is installed. As a result, even if the light intensity of the transmission signal changes when the surrounding temperature, self-generate heat, and power source voltage of the laser diode change, the components of the changes cancel each other. In this way, a parallel optical signal transmission apparatus which prevents its timing accuracy from getting deteriorated can be provided.

Furthermore, in the parallel optical signal transmission apparatus, by structuring the laser diodes in the form of a laser diode array, changes in the characteristic that are caused by changes in the self-generated heat of the laser diodes cancel each other. As a result, the changes in the characteristic that are caused by changes in the self-generated heat of the laser diodes can be controlled, which is advantageous.

In addition, in the parallel optical signal transmission apparatus, by installing laser drivers and a reference current source in the transmission side LSI together with other logic circuits and by installing a current-voltage conversion circuit and a comparator in the receiver side LSI together with other logic circuits, a high density packaging without any external circuit can be achieved, the amount of power consumption due to signal transmission can be greatly reduced, and the circuit operation can be accelerated.

Moreover, in the parallel optical signal transmission apparatus, by jointly using an emission power compensation circuit, the drive current-emission power characteristic of the laser diode is further stabilized.

Although the present invention has been described using its embodiments, the scope of the present invention is not limited to these embodiments. Those skilled in the art can add various modifications and improvements to the embodiments of the present invention. It is clear from the claims that such modified or improved embodiments can be also covered by the scope of the present invention.

What is claimed is:

1. An optical signal transmission apparatus having a laser driver for amplifying an electric signal to be transmitted and an optical signal laser diode for outputting an optical signal based on said electric signal, comprising:
    a reference current source which outputs as a reference current a prescribed proportion of a maximum current value of said electric signal; and
    a reference laser diode which generates a standard reference light, driven by said reference current.

2. An optical signal transmission apparatus as claimed in claim 1, comprising a plurality of said laser drivers which output a plurality of said electric signals in parallel.

3. An optical signal transmission apparatus as claimed in claim 1, wherein said laser diode and said reference laser diode are structured as a laser diode array.

4. An optical signal transmission apparatus as claimed in claim 1, wherein said reference current source outputs as said reference current approximately ½ said maximum current value of said electric signal.

5. An optical signal transmission apparatus as claimed in claim 1, wherein said reference laser diode constantly outputs said standard reference light.

6. An optical signal propagation apparatus comprising:
    a transmission unit which converts an electric signal into an optical signal and transmits said optical signal, having:
        a laser driver for amplifying said electric signal;
        an optical signal laser diode which outputs said optical signal based on said electric signal which said laser driver has amplified;
        a reference current source which outputs as a transmission side reference current a prescribed proportion of a maximum current value of said electric signal; and
        a reference laser diode which outputs a standard reference light based on said transmission side reference current;
    an optical fiber for propagating said optical signal; and
    a receiving unit which receives said optical signal that is propagated through said optical fiber, having:
        a current signal photo diode which receives said optical signal, which has been transmitted through said optical fiber, and converts said optical signal into a corresponding current signal;
        a reference current photo diode which receives said standard reference light, which has been transmitted through said optical fiber, and converts said standard reference light into a corresponding receiver side reference current;
        a current-voltage conversion circuit which converts said corresponding current signal and said corresponding receiver side reference current into a voltage signal and a reference voltage, respectively; and
        a comparator which compares said voltage signal with said reference voltage.

7. An optical signal propagation apparatus as claimed in claim 6, wherein said transmission unit has a plurality of said laser drivers which output a plurality of said electric signals in parallel.

8. An optical signal propagation apparatus as claimed in claim 6, wherein said optical signal laser diode and reference laser diode are structured as a laser diode array.

9. An optical signal propagation apparatus as claimed in claim 6, wherein said reference current source outputs as said transmission side reference current approximately ½ said maximum current value of said electric signal.

10. An optical signal propagation apparatus as claimed in claim 6, wherein said reference laser diode constantly outputs said standard reference light.

11. An optical signal propagation apparatus as claimed in claim 6, wherein said transmission unit further has a transmission side LSI which outputs said electric signal, and said laser driver and said reference current source are embedded in said transmission side LSI.

12. An optical signal propagation apparatus as claimed in claim 6, wherein said receiving unit further has a receiving side LSI which converts a comparison result of said comparator into a corresponding original electric signal.

13. An optical signal propagation apparatus as claimed in claim 6, wherein said transmission unit further has an emission power compensation circuit including:
    a compensation photo diode which receives a portion of an output light of said reference laser diode, converts said output light into a corresponding compensation current, and outputs said corresponding compensation current; and
    a compensation current-voltage conversion circuit which converts said compensation current, which said compensation photo diode has output, into a compensation voltage and outputs said compensation voltage;
    such that said emission power compensation circuit feeds said compensation voltage, which said compensation current-voltage conversion circuit has output, back to said laser driver and said reference current source.

14. An optical signal propagation apparatus as claimed in claim 7, wherein said receiving unit has a plurality of said comparators which compare a plurality of said voltage signals with said reference voltage in parallel.

15. An optical signal propagation apparatus as claimed in claim 12, wherein said current-voltage conversion circuit and said comparator are embedded in said receiving side LSI.

16. An optical signal transmission apparatus comprising:
a laser driver for amplifying an electric signal to be transmitted;
a reference current source which outputs as a reference current a prescribed proportion of a maximum current value of said electric signal;
a laser diode which outputs an optical signal and a standard reference light based on said electric signal and said reference current, respectively; and
a transmission side switch which causes said laser diode to connect selectively to said laser driver or said reference current source.

17. An optical signal transmission apparatus as claimed in claim 16, comprising a plurality of said laser drivers which output a plurality of said electric signals in parallel.

18. An optical signal propagation apparatus comprising:
a transmission unit which converts an electric signal into an optical signal and transmits said optical signal, having:
  a laser driver for amplifying said electric signal;
  a reference current source which outputs as a transmission side reference current a prescribed proportion of a maximum current value of said electric signal;
  a laser diode which outputs said optical signal based on said electric signal, which said laser driver has amplified, and a standard reference light based on said transmission side reference current; and
  a transmission side switch which causes said laser diode to connect selectively to said laser driver or said reference current source;
an optical fiber for propagating said optical signal; and
a receiving unit which receives said optical signal that is propagated through said optical fiber, having:
  a photo diode which receives said optical signal, which has been transmitted through said optical fiber, converts said optical signal into a corresponding current signal, receives said standard reference light, and converts said standard reference light into a corresponding receiver side reference current;
  a current-voltage conversion circuit which converts said corresponding current signal and said corresponding receiver side reference current into a voltage signal and a reference voltage, respectively; and
  a comparator which compares said voltage signal with said reference voltage.

19. An optical signal propagation apparatus as claimed in claim 18, wherein said transmission unit has a plurality of said laser drivers which output a plurality of said electric signals in parallel.

20. An optical signal propagation apparatus as claimed in claim 18, wherein said receiving unit further has a reference voltage output circuit which applies said reference voltage to said comparator.

21. An optical signal propagation apparatus as claimed in claim 18, wherein said transmission side switch is switched periodically to said reference current source.

22. An optical signal propagation apparatus as claimed in claim 19, wherein said receiving unit has a plurality of said comparators which compare a plurality of said voltage signals with said reference voltage in parallel.

23. An optical signal propagation apparatus as claimed in claim 20, wherein said receiving unit further has a receiver side switch which causes said reference voltage to be input to said reference voltage output circuit when said current-voltage conversion circuit outputs said reference voltage.

24. An optical signal propagation apparatus as claimed in claim 21, wherein a period with which said transmission side switch is switched to said reference current source is determined so that a fluctuation of an emission power intensity of said laser diode will not increase by a large amount during said period.

25. A method for propagating an optical signal from a transmission unit, which converts an electric signal into an optical signal and transmits said optical signal, via an optical fiber for propagating said optical signal, to a receiving unit for receiving said optical signal that has been propagated through said optical fiber, comprising the steps of:
outputting said electric signal from said transmission unit;
periodically outputting as a transmission side reference current a prescribed proportion of a maximum current value of said electric signal from said transmission unit;
outputting said optical signal to said optical fiber based on said electric signal, and outputting a standard reference light to said optical fiber based on said transmission side reference current from said transmission unit;
receiving said optical signal propagated through said optical fiber and converting said optical signal into a corresponding current signal, and receiving said standard reference light propagated through said optical fiber and converting said standard reference light into a corresponding receiver side reference current in said receiving unit;
converting said corresponding current signal into a voltage signal, and converting said corresponding receiver side reference current into a reference voltage in said receiving unit; and
comparing said voltage signal with said reference voltage in said receiving unit.

26. A method for propagating an optical signal as claimed in claim 25, wherein a plurality of said electric signals are output in parallel in said step of outputting said electric signal.

27. A method for propagating an optical signal from a transmission unit, which converts an electric signal into an optical signal and transmits said optical signal, via an optical fiber for propagating said optical signal, to a receiving unit for receiving said optical signal that has been propagated through said optical fiber, comprising the steps of:
outputting said electric signal from said transmission unit;
periodically outputting a positive current having a value that is larger than a prescribed proportion of a maximum current value of said electric signal and a negative current having a value that is smaller than said prescribed proportion of said maximum current value of said electric signal from said transmission unit;
outputting said optical signal to said optical fiber based on said electric signal, outputting a positive reference light to said optical fiber based on said positive current, and outputting a negative reference light to said optical fiber based on said negative current from said transmission unit;
receiving said optical signal that has been propagated through said optical fiber and converting said optical signal into a corresponding current signal, receiving said positive reference light that has been propagated through said optical fiber and converting said positive reference light into a corresponding positive current, and receiving said negative reference light that has been propagated through said optical fiber and converting said negative reference light into a corresponding negative current in said receiving unit;

converting said corresponding current signal, which corresponds to said optical signal, into a voltage signal in said receiving unit;

generating a reference voltage based on said corresponding positive current and said corresponding negative current in said receiving unit; and comparing said voltage signal with said reference voltage in said receiving unit.

28. A method for propagating an optical signal as claimed in claim 27, wherein a plurality of said electric signals are output in parallel in said step of outputting said electric signal.

29. An optical signal propagation apparatus comprising:
- a transmission unit which converts an electric signal into an optical signal and transmits said optical signal, having:
  - a laser driver for amplifying said electric signal;
  - a binary signal source which outputs a binary output having a prescribed duty ratio to said laser driver; and
  - a laser diode which outputs said optical signal based on said electric signal and a binary reference light based on said binary output;
- an optical fiber for propagating said optical signal; and
- a receiving unit which receives said optical signal that is propagated through said optical fiber, having:
  - a photo diode which receives said optical signal, which has been transmitted through said optical fiber, converts said optical signal into a corresponding current signal, receives said binary reference light and converts said binary reference light into a corresponding binary reference current;
  - a current-voltage conversion circuit which converts said corresponding current signal and said corresponding binary reference current into a voltage signal and a binary reference voltage, respectively;
  - a smoothing circuit which outputs a single-value reference voltage based on said binary reference voltage and said prescribed duty ratio, respectively; and
  - a comparator which compares said voltage signal with said reference voltage.

30. An optical signal propagation apparatus as claimed in claim 29, wherein said transmission unit has a plurality of said laser drivers which output a plurality of said electric signals in parallel.

31. An optical signal propagation apparatus as claimed in claim 29, wherein said binary signal source is a clock signal source.

32. An optical signal propagation apparatus as claimed in claim 30, wherein said receiving unit has a plurality of said comparators which compare a plurality of said electric signals with said reference voltage in parallel.

* * * * *